UNITED STATES PATENT OFFICE.

ROBERT W. LESLEY AND DAVID GRIFFITH, OF EGYPT, PENNSYLVANIA, ASSIGNORS TO THE PENNSYLVANIA PATENT RIGHT COMPANY, OF SAME PLACE.

MANUFACTURE OF CEMENT.

SPECIFICATION forming part of Letters Patent No. 321,121, dated June 30, 1885.

Application filed November 22, 1884. (No specimens.)

*To all whom it may concern:*

Be it known that we, ROBERT W. LESLEY and DAVID GRIFFITH, of Egypt, in the county of Lehigh and State of Pennsylvania, have invented a new and useful Improvement in the Manufacture of Cement, of which the following is a specification.

Cement as commonly manufactured, and Portland cement, especially, contains a large amount of lime in its composition. In Portland cement, particularly, a small excess of lime is usually to be found. This excess, which consists of lime not in combination with the silica and alumina in the cement, is very injurious, as it causes the cement to swell and crack after it is used in masonry, and in many cases to go to pieces when placed in water. In order to overcome this difficulty, which is incident as well to the manufacture of the ordinary home-made cements as to the Portland cements, various methods have been adopted, the object of all of which is the killing of the free lime which remains uncombined. The method heretofore most commonly in use is to allow the cement, after grinding, to cool or "sweat" for several weeks or months, spread out in thin layers in large, well-ventilated store-houses. The cement thus absorbs from the air moisture and carbonic-acid gas, which neutralize and kill the free lime; but this method of seasoning involves loss of time and interest on stock. It has also been essayed to attain the same object by subjecting the cement to the action of carbonic-acid gas; but this process is objectionable, both because of the expense attending the manufacture of gas and because of the difficulty of efficiently applying it.

With a view to avoiding the foregoing objections still another method of seasoning the cement has been devised, which consists in adding to it water in proper proportion to destroy or neutralize the excess of lime. This method is entirely effective for the purpose; but its use in connection with certain kinds of cement-rocks has been attended with certain mechanical disadvantages, due to the fact that the cement material, if treated before the grinding, is apt to "gum" the millstones, and if treated after grinding is apt to ball up and clog the conveyers or elevators which are used to carry it off. The object of this improvement is to remove these objections attending the practice of the process last above recited, and this end we attain by acting on the cement material with a forced current of air containing water in the shape of moisture in volume sufficient to destroy or neutralize the free uncombined lime in the cement treated.

Our improvements can readily be carried out in various ways. One way is as follows: There are various points in a cement-works where the manufactured article after grinding passes in a thin film or body through closed boxes—such, for instance, as the conveyer or elevator boxes—or at the point where it is emptied from the one to the other of these. At any such point an ordinary blower or fan may be placed, having its discharge-mouth opening into the cement-conduit and drawing from any suitable source a supply of moist air, which will be blown into the cement-conduit, thus maintaining in a moist atmosphere the cement passing along through the conduit. The air can be moistened, either before or after it leaves the blower, by steam or vapor, by passing over or through reticulated fibrous mats or screens kept moist by capillary action, or by being forced or drawn through a body of water, or in any other suitable known way.

The most convenient location for the moist-air inlet is in the conveyer trough or box, which is a closed trough of very considerable length containing a rotating shaft extending lengthwise of the trough, and armed with paddles, blades, or equivalent instrumentality, by which the cement is stirred up and fed along. The cement under these conditions, as it is turned over and over and stirred up, is maintained in a moisture-laden atmosphere, with which, practically, all its particles have contact. This treatment is effective to destroy the free lime in the cement without causing the latter to ball up or become sticky. The proportion of moisture can be varied according to the needs of the work, either by charging the air more or less with the moisture, or by varying the force of the blast or moist-air current.

The water used may be charged with carbonic-acid gas when it is desired to add that ingredient to the moist-air current, or when it is desired to add an alkali, such as soda or potash, to the finely-ground cement. This object likewise may be attained by adding the material in question to the water to be vaporized.

We have described the best way known to us of carrying our improvement into practice. We do not, however, confine ourselves to the specific details hereinbefore set forth in illustration of the improvement; but

What we claim as new and of our invention is—

The method of artificially seasoning cements by subjecting the same, after the final grinding operation and in pulverulent condition, to the action of a forced current of air charged with moisture, substantially as described.

In testimony whereof we have hereunto set our hands this 17th day of November, 1884.

R. W. LESLEY.
D. GRIFFITH.

Witnesses:
H. E. GUILLOÛ,
A. D. KACHLINE.